INVENTORS:
BEB H. ROWLETT,
ALEXANDER SILVER,
BY
*J. Thomas Eubanks*

Attorney.

United States Patent Office 3,079,127
Patented Feb. 26, 1963

3,079,127
TEMPERATURE RESPONSIVE VARIABLE MEANS FOR CONTROLLING FLOW IN TURBOMACHINES
Beb H. Rowlett, Playa Del Rey, and Alexander Silver, East Woodland Hills, Calif., assignors to The Garrett Corporation, Los Angeles, Calif., a corporation of California
Original application Nov. 23, 1956, Ser. No. 623,913, now Patent No. 2,980,394, dated Apr. 18, 1961. Divided and this application Apr. 6, 1961, Ser. No. 101,141
4 Claims. (Cl. 253—52)

This invention relates to a temperature responsive means for controlling flow in turbomachines.

This application is a division of our copending application, Serial No. 623,913, for Temperature Responsive Variable Means for Controlling Flow in Turbomachines, filed November 23, 1956, now Patent No. 2,980,394.

When a turbomachine utilizes a supply of compressible fluid as a motive medium, the machine may extract energy from the fluid in proportion to the temperature and pressure thereof. The useful energy of the fluid therefore may, under certain conditions of flow and pressure, be varied by a change of the fluid temperature. Thus, when compressed fluid, the temperature of which varies, is used to operate a turbomachine, a temperature responsive flow control means may be utilized to vary the flow to make the most efficient use of the thermal energy contained in the fluid.

Turbines provided with fixed area inlet nozzles may be designed to produce power to meet a minimum requirement. These turbines are designed to produce the desired minimum power output when operated by a compressed fluid having given flow and thermal energy components. When the temperature of the fluid increases, the power output of the turbine increases relative to the desired minimum. In some cases the increased power occasioned by an increase in the fluid temperature is wasteful and therefore contributes to inefficient use of the thermal energy.

Cooling turbines operated by means of compressed bleed air are frequently subjected to changing temperatures at the inlets thereof. In the operation of cooling turbines for conditioning an enclosure, it is sometimes desirable to maintain a substantially constant refrigeration output of the cooling turbine. In order to maintain a constant refrigeration output of the cooling turbine when the temperature of compressed air at the inlet thereof varies, the present invention employs a temperature responsive variable area nozzle to control flow through the cooling turbine.

In the operation of the cooling turbine, the temperature responsive variable area nozzle may be used to reduce flow through the cooling turbine when the fluid at the outlet thereof exceeds a predetermined value. In this manner the temperature responsive variable area nozzle means will admit a minimum amount of compressed air to operate the cooling turbine, thus conserving power. At the same time it also assists in controlling refrigeration provided by the turbine for use in the enclosure.

It is an object of the present invention, therefore, to provide a temperature responsive variable means for a turbomachine to conserve the thermal energy component of a compressed fluid flowing therethrough, while the turbomachine is producing a constant power or refrigeration output.

Another object of this invention is to provide a novel combination of a temperature responsive device operably connected with a variable inlet device to control fluid flow through a turbomachine.

Further objects and advantages of the invention will appear from the following specification, appended claims and accompanying drawings in which:

Figure 1:
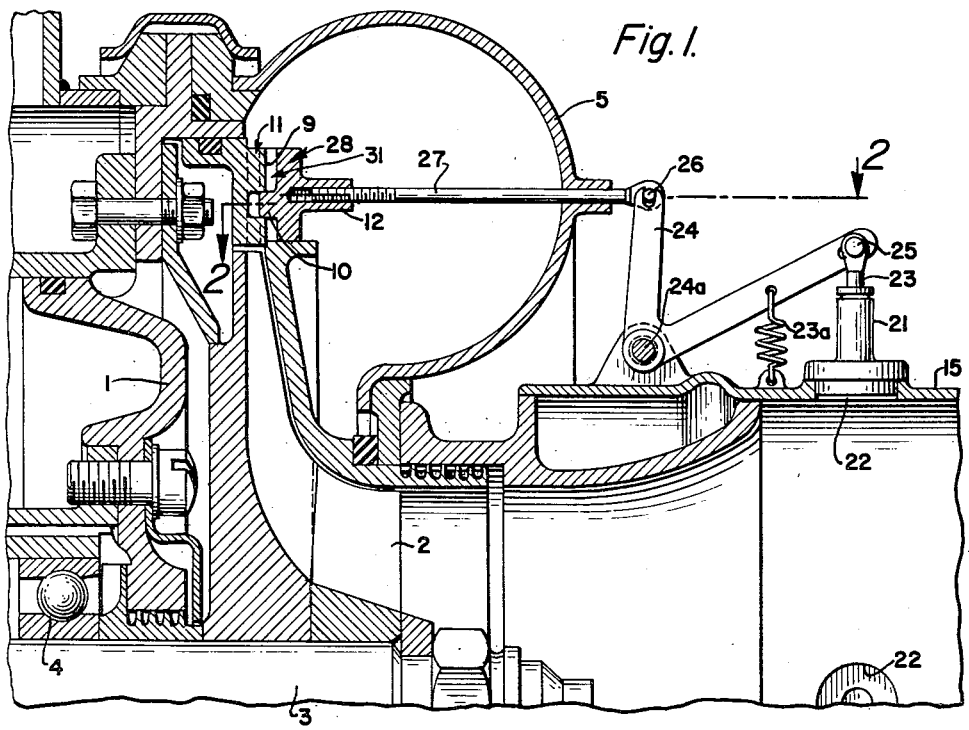
FIG. 1 is a sectional view of a temperature responsive variable means, according to the invention, shown applied to a turbomachine.
Figure 2:
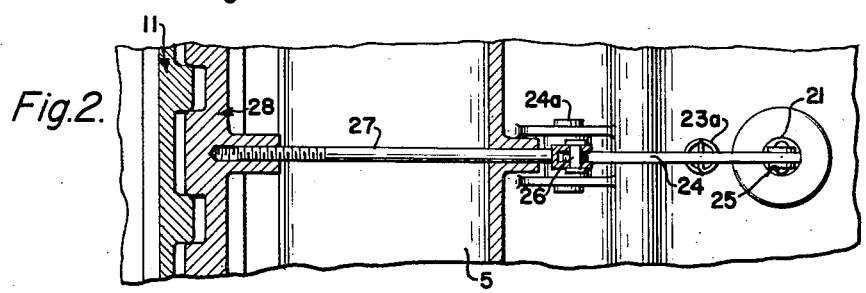
FIG. 2 is a sectional view taken through line 2—2 of FIG. 1 showing the linkage used to actuate the variable area nozzle means.
Figure 3:
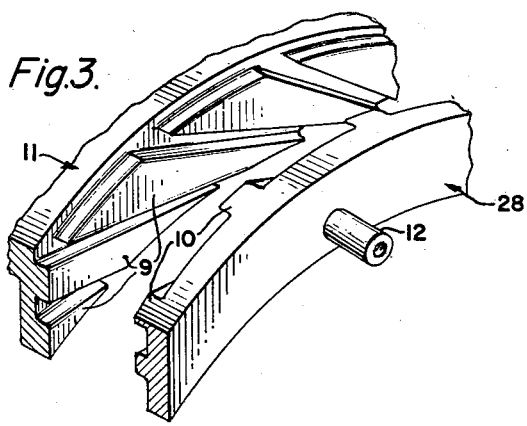
FIG. 3 is an enlarged perspective view of a portion of the variable area nozzle device shown in FIG. 1.

Referring to the drawing there is shown a conventional turbine comprising a housing 1, in which a wheel 2 mounted on a shaft 3 is rotatably supported by a bearing 4. Located at the periphery of the wheel 2 is an inlet plenum 5, which is supplied with compressed bleed air.

The turbine is provided with a variable area nozzle 31 which controls the flow of compressed air from the plenum 5 to the turbine wheel 2. The variable area nozzle comprises a ring shaped movable portion 28 provided with axially projecting vane elements 10, which are interleaved or meshed with conforming elements 9 of a stationary portion 11. The movable portion 28 also has a plurality of bosses 12 projecting outwardly from the side opposite the vane elements 10, each of the bosses being adapted to receive a rod 27 in the manner hereinafter described.

Rotation of the turbine wheel 2 is initially induced by fluid, under pressure in the plenum 5, passing through the interleaved nozzle elements 28 and 11 and between the blades of the wheel 2. The energy of the fluid is imparted to rotate the wheel 2 as the fluid expands and passes therethrough, and the expanded fluid is exhausted through an exhaust duct 15.

The temperature responsive variable means includes a plurality of circumferentially spaced temperature responsive elements 21 mounted on the wall of the turbine exhaust duct 15 and disposed to sense the temperature of the fluid flowing through the duct from the turbine. Each temperature responsive element 21 includes a conventional thermostatic or temperature sensitive variable element 22 disposed exteriorally of the exhaust duct and arranged to actuate a piston 23, so that an increase in temperature of the variable element 22 extends the piston 23 and a decrease in temperature permits the piston 23 to be retracted by a spring 23a connected to a bellcrank 24, one end of which is pivotally connected to the piston 23 by a pin 25. Each bellcrank 24 is pivoted on a pin 24a supported by ears mounted on and projecting radially outwardly from the turbine exhaust duct 15, and is connected at its end remote from the piston 23 to one of the rods 27. The rods 27 are slidably mounted in the wall of the plenum 5 and have their other ends threaded into the bosses 12 on the movable portion 28 of the variable area nozzle 31 as hereinabove noted. Each of the bellcranks 24 transmits the force of the attached temperature responsive element 21 to the axially movable rod 27. The rods 27 move and guide the movable portion 28 of the variable area nozzle axially relative to the turbine wheel.

In operation, when the exhaust temperature of the turbine is reduced below a preselected value, the temperature sensitive variable elements 22 in the wall of the exhaust duct 15 contract and allow the spring 23a to retract the piston 23. The resulting movement of the bellcranks 24 is transmitted through the rods 27 to move the movable portion 28 of the variable area nozzle 31 relative to the stationary portion 11 thereof to open the variable area nozzle and increase the fluid flow through the turbine wheel 2, thus raising the temperature of the exhaust fluid to the preselected value.

If the exhaust temperature of the turbine exceeds the preselected value, the temperature sensitive variable elements 22 in the wall of the exhaust duct 15 expand, thus moving the bellcranks 24 and the axially movable rods 27 in a direction to move the movable portion 28 of the variable area nozzle 31 relative to the stationary portion 11, to close the variable area nozzle. Such restriction of the nozzle area reduces the fluid flow through the turbine wheel 2, thus conserving power and reducing the temperature of the exhaust fluid to the preselected value.

If the temperature of the fluid at the turbine inlet increases, the resultant increase in the temperature of the fluid in the exhaust duct 15 will expand the temperature sensitive variable element 22 and move the piston 23, bellcrank 24 and rod 27 in a direction to close the variable area nozzle 31. Such restriction of the nozzle area reduces the fluid flow through the turbine wheel 2, thus conserving the thermal energy component of the compressed fluid flowing through the turbomachine and producing a constant power and refrigeration output.

We claim:

1. In a temperature responsive variable means for controlling the flow of fluid in turbomachines:
   a casing having a fluid inlet and an exhaust duct;
   a turbine wheel rotatably mounted in said casing in the flow between said inlet and said exhaust duct;
   a variable area nozzle disposed in said casing adjacent the periphery of the turbine wheel, said nozzle having an annular member movable substantially axially relative to the axis of said turbine wheel to vary the opening of said nozzle;
   a plurality of circumferentially spaced temperature responsive elements mounted on the casing wall exteriorly of the exhaust duct and arranged to be subjected to the temperature of the fluid therein;
   piston means disposed to be actuated by said temperature responsive elements in response to changes in the temperature of the fluid in said exhaust duct;
   and a plurality of motion transmitting means disposed exteriorly of said variable area nozzle and connecting said movable annular member and said piston means in a manner to move said annular member in a direction to decrease the opening of said variable area nozzle when the temperature of the fluid in the exhaust duct increases, and to increase the opening of the nozzle when the temperature of the fluid decreases in the exhaust duct decreases.

2. In a temperature responsive variable means for controlling the flow of fluid in turbomachines:
   a casing having a fluid inlet and an exhaust duct;
   a turbine wheel rotatably mounted in said casing in the flow between said inlet and said exhaust duct;
   a variable area nozzle disposed in said casing adjacent the periphery of the turbine wheel, said nozzle having an annular member movable substantially axially relative to the axis of said turbine wheel to vary the opening of said nozzle;
   a plurality of circumferentially spaced temperature responsive means mounted exteriorly of the exhaust duct and arranged to be subjected to the temperature of the fluid therein;
   and motion transmitting means disposed exteriorly of said variable area nozzle and connecting said movable annular member and said temperature responsive means in a manner to decrease the opening of said variable area nozzle when the temperature of the fluid in the exhaust duct increases, and to increase the opening of the nozzle when the temperature of the fluid in the exhaust duct decreases.

3. In a temperature responsive variable means for controlling the flow of fluid in turbomachines:
   a casing having fluid inlet and outlet passages;
   a turbine wheel rotatably mounted in said casing between said inlet and outlet passages;
   a variable area nozzle disposed in said casing adjacent the periphery of the turbine wheel;
   a plurality of circumferentially spaced temperature responsive means mounted exteriorly of the outlet passage and arranged to be subjected to the temperature of the fluid therein;
   and driving connections connecting said variable area nozzle and said temperature responsive means in a manner to decrease the opening of said variable area nozzle when the temperature of the fluid in the outlet passage increases, and to increase the opening of the nozzle when the temperature of the fluid in the outlet passage decreases.

4. In a temperature responsive variable means for controlling the flow of fluid in turbomachines:
   a casing having walls forming a fluid inlet and an exhaust duct;
   a turbine wheel rotatably mounted in said casing in the flow between said inlet and said exhaust duct;
   a variable area nozzle disposed in said casing adjacent the periphery of the turbine wheel, said nozzle having an annular member movable substantially axially relative to the axis of said turbine wheel to vary the opening of said nozzle;
   a plurality of circumferentially spaced temperature responsive elements mounted on the casing wall exteriorly of the exhaust duct and arranged to be subjected to the temperature of the fluid therein;
   piston means disposed to be actuated by said temperature responsive elements in response to changes in the temperature of the fluid in said exhaust duct;
   lever means pivotally supported on the wall of said exhaust duct and operatively connected to said piston means;
   and a plurality of motion transmitting members disposed exteriorly of said variable area nozzle and connecting said movable annular member and said lever means in a manner to move said annular member in a direction to decrease the opening of said variable area nozzle when the temperature of the fluid in the exhaust duct increases, and to increase the opening of the nozzle when the temperature of the fluid in the exhaust duct decreases.

References Cited in the file of this patent

UNITED STATES PATENTS

| | | |
|---|---|---|
| 2,095,991 | Lysholm | Oct. 19, 1937 |
| 2,219,994 | Jung | Oct. 29, 1940 |
| 2,305,311 | Jendrassik | Dec. 15, 1942 |
| 2,625,789 | Starkey | Jan. 20, 1953 |
| 2,739,782 | White | Mar. 27, 1956 |
| 2,861,774 | Buchi | Nov. 25, 1958 |